United States Patent
Lee

(10) Patent No.: US 7,193,653 B2
(45) Date of Patent: Mar. 20, 2007

(54) CAMERA LENS ASSEMBLY AND PORTABLE WIRELESS TERMINAL COMPRISING THE SAME

(75) Inventor: Sang-wook Lee, Kumi-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 766 days.

(21) Appl. No.: 10/339,465

(22) Filed: Jan. 10, 2003

(65) Prior Publication Data

US 2004/0198433 A1 Oct. 7, 2004

(30) Foreign Application Priority Data

Nov. 13, 2002 (KR) .................... 10-2002-0070251

(51) Int. Cl.
*H04N 5/225* (2006.01)
(52) U.S. Cl. ..................... 348/373; 455/556
(58) Field of Classification Search ............... 348/373, 348/375, 376; D14/345, 138, 202; 455/66.1, 455/556.1
See application file for complete search history.

(56) References Cited

U.S. PATENT DOCUMENTS

| 5,748,441 | A | * | 5/1998 | Loritz et al. ............... 361/683 |
| 5,801,919 | A | * | 9/1998 | Griencewic ............... 361/683 |
| 5,815,759 | A | * | 9/1998 | Tseng et al. ............... 396/541 |
| 6,788,960 | B2 | * | 9/2004 | Masutani et al. ........ 455/556.1 |

\* cited by examiner

*Primary Examiner*—Ngoc-Yen Vu
*Assistant Examiner*—Nicholas G. Giles
(74) *Attorney, Agent, or Firm*—Roylance, Abrams, Berdo & Goodman, L.L.P.

(57) ABSTRACT

A portable wireless terminal, comprising a main body, a folder hinged to the main body so as to be opened from and closed into the main body, and a camera lens assembly rotatably connected to a hinge axis of the folder, such that the camera lens assembly is formed as a body tube so as to be drawn into and out from the main body in the direction of the hinge axis. The camera lens assembly of the portable wireless terminal is drawn out from one side of the terminal, to not limit the range of its photographing angle by the main body or the folder of the terminal. Further, the camera lens assembly drawn out from the main body of the portable wireless terminal is easily adjusted directionally, to allow for convenient manipulation by users.

21 Claims, 7 Drawing Sheets

CAMERA LENS ASSEMBLY AND PORTABLE WIRELESS TERMINAL COMPRISING THE SAME

PRIORITY

This application claims priority to an application entitled "CAMERA LENS ASSEMBLY AND PORTABLE WIRELESS TERMINAL THEREWITH", filed in the Korean Industrial Property Office on Nov. 13, 2002 and assigned Serial No. 2002-70251, the contents of which are hereby incorporated by reference.

BACKGROUND OF THE INVENTION

1. Field of the Invention

The present invention relates to a portable wireless terminal, and more particularly to a camera lens assembly installed on a portable wireless terminal.

2. Description of the Related Art

Recently, portable wireless terminals with various functions and shapes have been developed in parallel with the growth of the information and communication industry. Typically, portable wireless terminals are divided into several types, namely, bar-type terminals, flip-type terminals provided with a flip cover, and folder-type terminals provided with a folder rotatably connected to a main body so as to be opened from and closed into the main body at a designated angle. The folder-type terminal is formed so that the folder is opened from the main body in a communication mode, thereby assuring a sufficient distance between a transmitting unit and a receiving unit while reducing the overall size of the terminal by half. Also, because the folder is closed into the main body after the communication, it is handy to carry. Therefore, the folder-type terminal is one of the most popular terminals in use today.

In addition to performing basic communication functions with a counterpart terminal, the terminals have various functions, for example, a function of transmitting and receiving e-mail or data, and an Internet game function. As various communication techniques including a CDMA 1×EVDO (Evolution Data Only) system are introduced, services of the information and communication industry are advancing toward including picture communication and moving picture services between terminals.

Therefore, in order to perform the aforementioned functions, various buttons, a camera lens assembly, and so on, are installed on the terminal. In particular, since services using the portable wireless terminal are expanding so as to include picture communication and moving picture services, the portable wireless terminal includes a camera lens assembly.

FIG. 1 is a perspective view of a portable wireless terminal 100 comprising a conventional camera lens assembly 130. As shown in FIG. 1, the portable wireless terminal 100 comprises a main body 101, and a folder hinged to the main body 101 so as to be rotatably opened from and closed into the main body 101. Herein, the camera lens assembly 130 is rotatably connected to a hinge axis H of the folder 102.

A keypad 111 and a transmitting unit 113 are installed on an upper surface of the main body 101. The keypad 111 includes function keys used to recall and select various menus, and keys for inputting numbers and letters. Side hinge arms are respectively installed on both sides of the upper end of the main body 101, thereby connecting the folder 102 to the main body 101.

A display device 121 and a receiving unit 123 are installed on one surface of the folder 102, opposite to the upper surface of the main body 101. The display device 121 serves to output information pertaining to the operational states of the terminal, information stored in the terminal as well as transmitting and receiving information. A center hinge arm 125 is installed on a lower end of the folder 102 so as to correspond to the side hinge arms 115. The center hinge arm 125 is connected to the side hinge arms 115 by a hinge device (not shown). Therefore, the folder 102 is rotatable about the hinge axis H formed by connecting the center hinge arm 125 to the side hinge arms 115, thereby being able to be opened from and closed into the main body 101.

The camera lens assembly 130 is connected to one of the side hinge arms 115. Therefore, this side hinge arm 115 is close to the center of the top end of the main body 101, and the camera lens assembly 130 is connected to one end of the side hinge arm 115. The camera lens assembly 130 is rotatably connected to the hinge axis H, thereby being able to photograph a subject at various angles.

However, the conventional camera lens assembly of the portable wireless terminal is partially supported by the main body of the terminal so as to prevent breakdown and/or damage to the camera lens assembly. Therefore, the conventional camera lens assembly cannot photograph a subject in a direction in which the camera lens assembly is supported by the main body, and thus limits the range of photographing to a state when the folder is opened from the main body. Furthermore, since an area in which the lens housing can be manipulated is narrow, the ability to rotate the camera lens assembly to desired photographing directions is limited.

SUMMARY OF THE INVENTION

Therefore, an object of the present invention is to provide a camera lens assembly for a portable wireless terminal with an expanded range of its photographing angle, in order to substantially overcome the above deficiencies of the conventional terminal.

It is another object of the present invention to provide a camera lens assembly of a portable wireless terminal which is easily rotated to a desired direction for photographing a subject by a user.

In accordance with an embodiment of the present invention, the above and other objects can be substantially accomplished by a camera lens assembly of a portable wireless terminal, comprising a first guide housing having a cylindrical shape with both ends opened and having a designated length, and a second guide housing having a cylindrical shape with both ends opened, and being rotatable within the first guide housing and inserted into the first guide housing so as to be drawn into and out from the first guide housing in a longitudinal direction. The camera lens assembly further comprises a lens housing for accommodating a camera lens, including a guide shaft extended from its one end in a longitudinal direction so as to be drawn into and out from the second guide housing in a longitudinal direction.

Another embodiment of the present invention provides a portable wireless terminal, comprising a main body, a folder hinged to the main body so as to be opened from and closed into the main body, and a camera lens assembly rotatably connected to a hinge axis of the folder, such that the camera lens assembly is formed as a body tube so as to be drawn into and out from the main body in the direction of the hinge axis.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
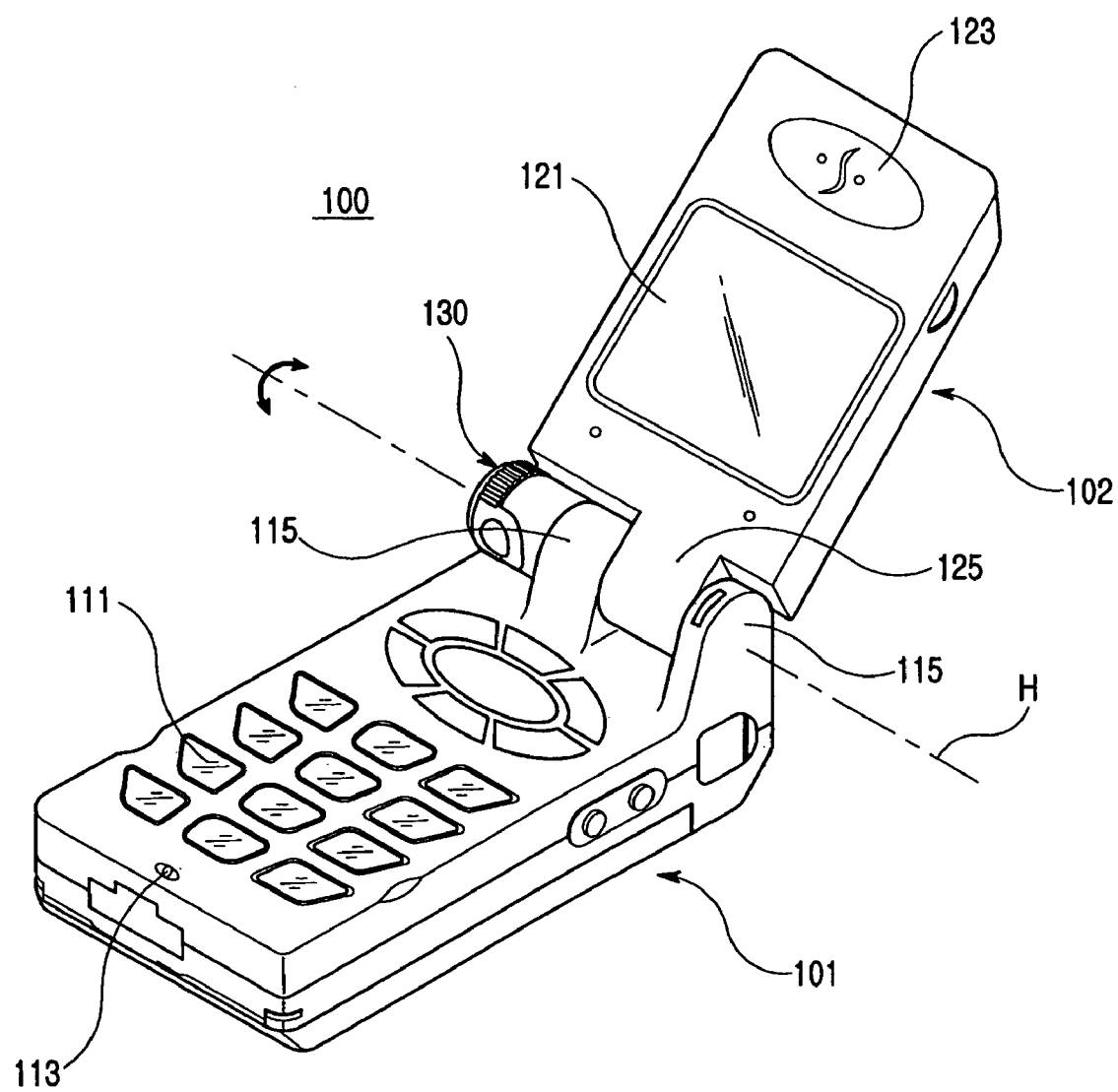
FIG. 1 is a perspective view of a portable wireless terminal comprising a conventional camera lens assembly.

Certain embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein will be omitted for conciseness.

Figure 2:
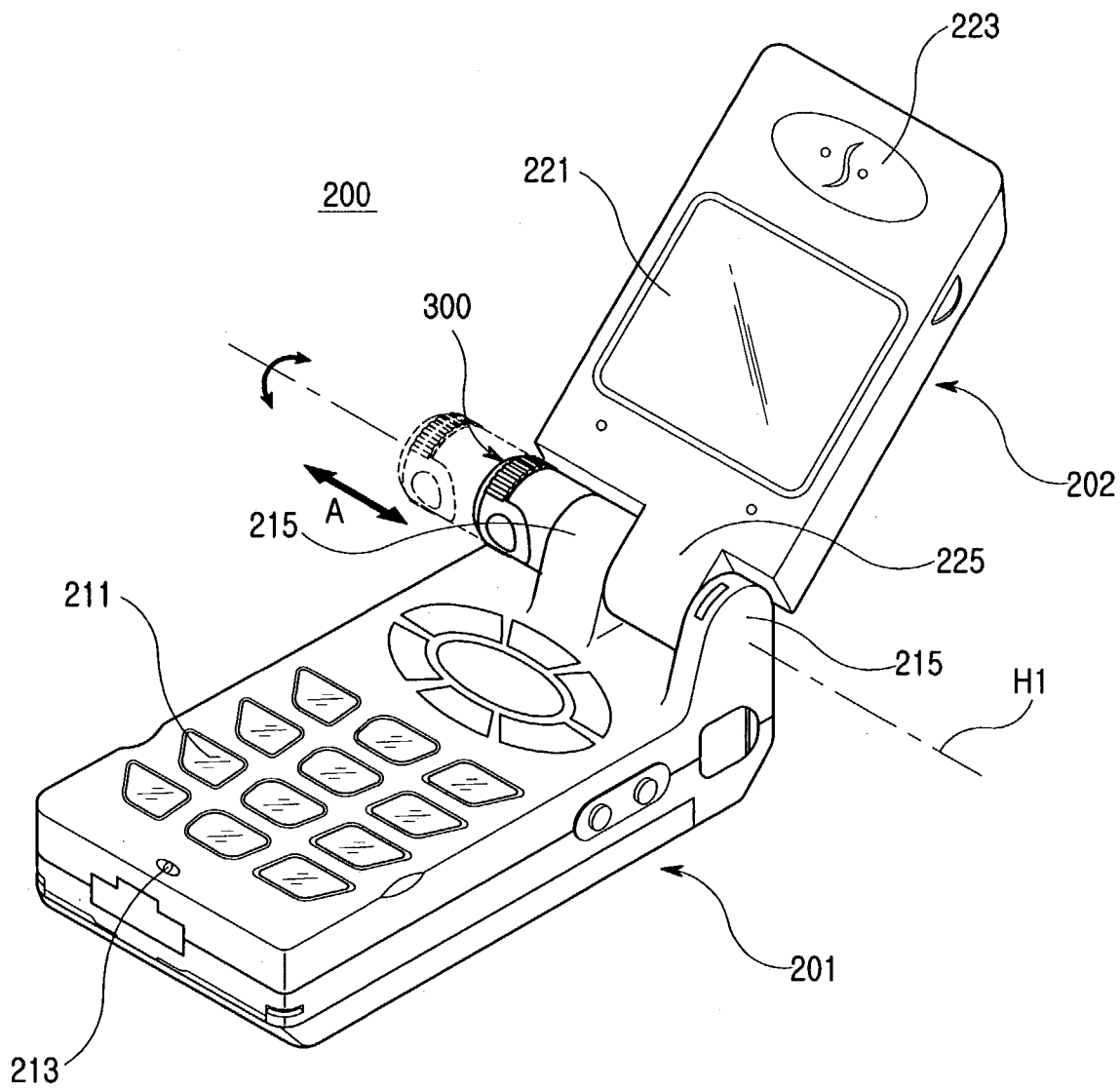
FIG. 2 is a perspective view of an example of a portable wireless terminal comprising a camera lens assembly in accordance with an embodiment of the present invention.

FIG. 2 is a perspective view of a portable wireless terminal 200 comprising a camera lens assembly 300 in accordance with an embodiment of the present invention. As shown in FIG. 2, the camera lens assembly 300 is drawn into and out from the terminal 200 in a horizontal direction of A. The portable wireless terminal 200 comprises a main body 201, a folder 202, and a hinge device (not shown) for rotatably connecting the folder 202 to the main body 201.

A keypad 211 and a transmitting unit 213 are installed on an upper surface of the main body 201. Side hinge arms 215 are respectively installed on both sides of the upper end of the main body 201, thereby connecting the folder 202 to the main body 201.

A display device 221 and a receiving unit 223 are installed on a surface of the folder 202 opposite to the upper surface of the main body 201. A center hinge arm 225 is installed on the lower end of the folder 202 so as to correspond to the side hinge arms 215, thereby being connected to the side hinge arms 215 by the hinge device. Therefore, the folder 202 is rotated about a hinge axis H1 formed by connecting the center hinge arm 225 to the side hinge arms 215, to be opened from and closed into the main body 201.

The camera lens assembly 300 is connected to one of the side hinge arms 215. This side hinge arm 215 is located adjacent to the center of the upper end of the main body 201, and the camera lens assembly 300 is connected to one end of the side hinge arm 215. The camera lens assembly 300 is rotatably connected to the hinge axis H1, thereby being capable of photographing a subject in various directions. Furthermore, the camera lens assembly 300 is drawn into and out from the main body 201 in the direction of the hinge axis H1.

Hereinafter, the camera lens assembly 300 is described in detail with reference to FIGS. 3 to 7.

Figure 3:
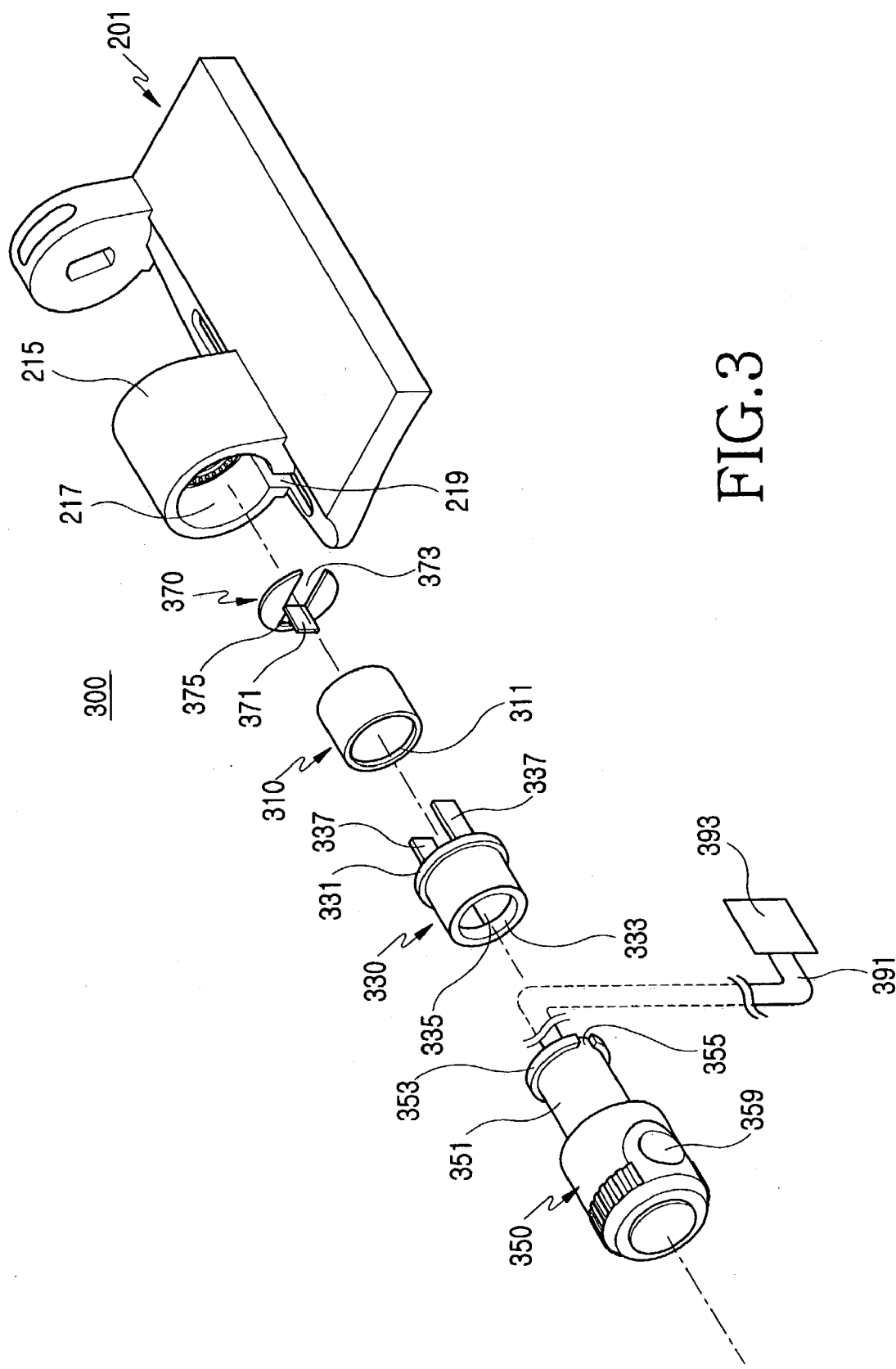
FIG. 3 is an exploded perspective view of the camera lens assembly of FIG. 2.

FIG. 3 is an exploded perspective view of the camera lens assembly 300 of FIG. 2. As shown in FIG. 3, the camera lens assembly 300 includes a first guide housing 310, a second guide housing 330, a lens housing 350, and a holding plate 370. The camera lens assembly 300 has a structure of a body tube so as to be drawn out from one side of the terminal 200.

The first guide housing 310 is shaped as a cylinder with both ends opened, and is fixed to one of the both side hinge arms 215 of the main body 201. A receiving hole 217 for fully receiving the first guide housing 310 is formed on this side hinge arm 215. Furthermore, a slit 219 for receiving a flexible printed circuit 391 for connecting a camera lens (not shown) to a main board (not shown) installed in the main body 201 is formed on the side hinge arm 215, thereby enabling the receiving hole 217 to being in communication with the inside of the main body 201. A connector 393 connected to the main board is formed on the end of the flexible printed circuit 391. A first stopper 311 with a designated depth protrudes from the inner circumference of one end of the first guide housing 310 along a circumferential direction. The first stopper 311 limits a drawing distance of the second guide housing 330 out from the first guide housing 310.

The second guide housing 330 is rotatably inserted into the first guide housing 310 so as to be drawn into and out from the first guide housing 310. The second guide housing 330 is formed as a cylinder, and includes a second stopper 331 protruding from an outer circumference of its one end in a circumferential direction so as to correspond to the first stopper 311. The second stopper 331 also limits the drawing distance of the second guide housing 330 out from the first guide housing 310. At least one sliding guide 335 extends from the inner circumference of the second guide housing 330 in a longitudinal direction, and printed circuit protectors 337 extend from one end of the sliding guide 335 in the longitudinal direction. Preferably, the sliding guide 335 is integrally formed with the protectors 337. Specifically, a portion located on the inner circumference of the second guide housing 330 serves as the sliding guide 335 for guiding the drawing of the lens housing 350 into and out from the main body 201 of the terminal 200, and a portion outwardly extended from the one end of the second guide housing 330 serves as the protectors 337 for protecting the flexible printed circuit 391. A third stopper 333 protrudes the inner circumference of the other end of the second guide housing 330 in the circumferential direction.

A camera lens (not shown) is accommodated within the lens housing 350, and a guide shaft 351 is extended from one end of the lens housing 350. The lens housing 350 is provided with a window 359 for exposing the camera lens. The guide shaft 351 is inserted into the second guide housing 330 in the longitudinal direction so as to be drawn into and out from the second guide housing 330. A fourth stopper 353 is provided on the outer circumference of one end of the guide shaft 351 so as to correspond to the third stopper 333 of the second guide housing 330. Therefore, the drawing distance of the lens housing 350 out from the second guide housing 330 is limited by the third and fourth stoppers 333 and 353. A sliding recess 355 is formed on a designated portion of the fourth stopper 353. Since the sliding recess 355 corresponds to the sliding guide 335 of the second guide housing 330, the lens housing 350 performs a rectilinear motion so as to be drawn into and out from the second guide housing 330, and the range of rotation of the lens housing 350 is limited.

The flexible printed circuit 391 for connecting the camera lens accommodated in the lens housing 350 to the main board accommodated in the main body 201 is drawn out from the end of the guide shaft 351. Therefore, a through hole (not shown) for receiving the flexible printed circuit 391 is formed on the guide shaft 351.

The holding plate 370 is rotatably connected to the other end of the first guide housing 310. The holding plate 370 includes a holder 371 and an opening 373 formed by cutting two parallels separated from each other by a designated width and bending the cut portion outwardly. A through hole 375 is formed through the holding plate 370 being opposite to the opening 373. Each of the protectors 337 of the second guide housing 330 passes through a corresponding one of the opening 373 and the through hole 375. The flexible printed circuit 391 protrudes to the outside via the opening 373, and is connected to the main board within the main body 201 of the terminal 200.

Figure 4:
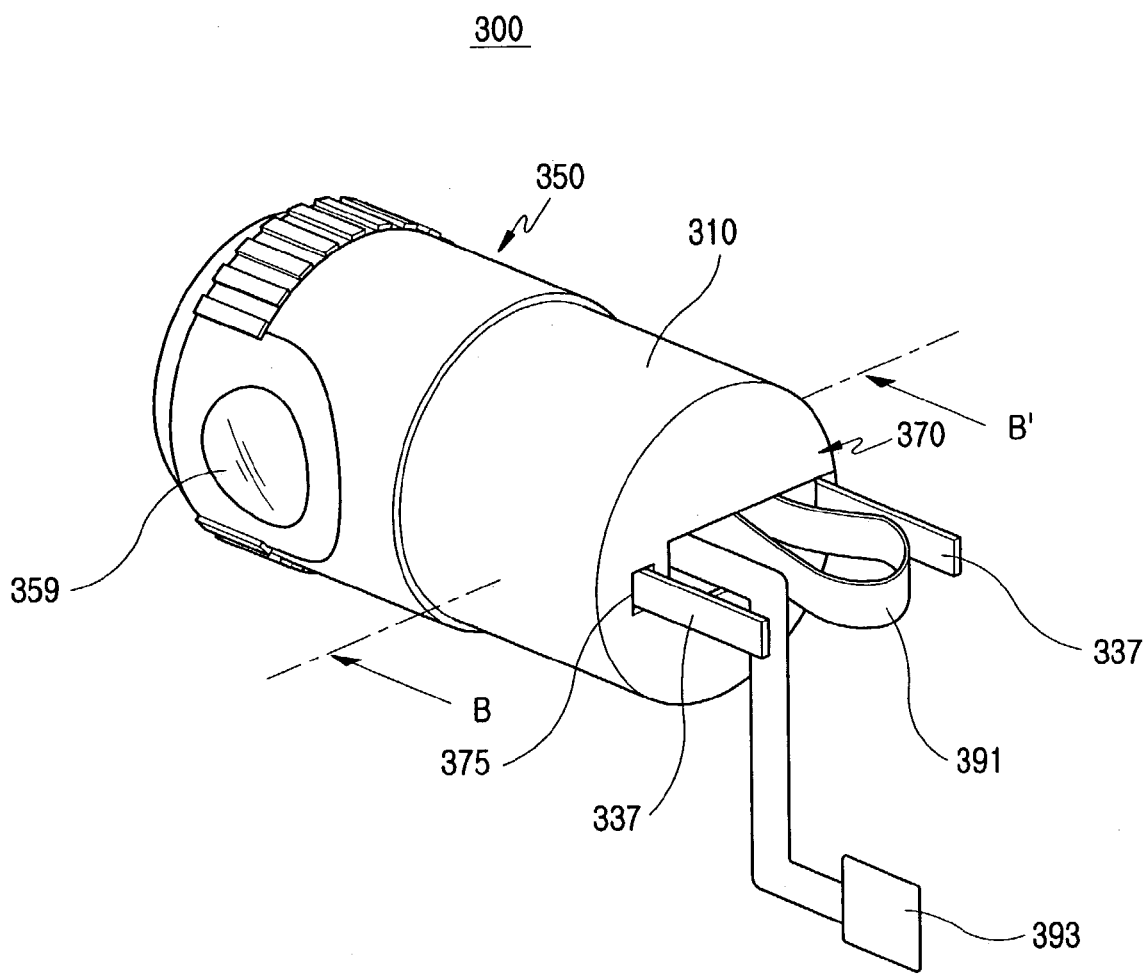
FIG. 4 is an assembled perspective view of the camera lens assembly of FIG. 2.
Figure 5:
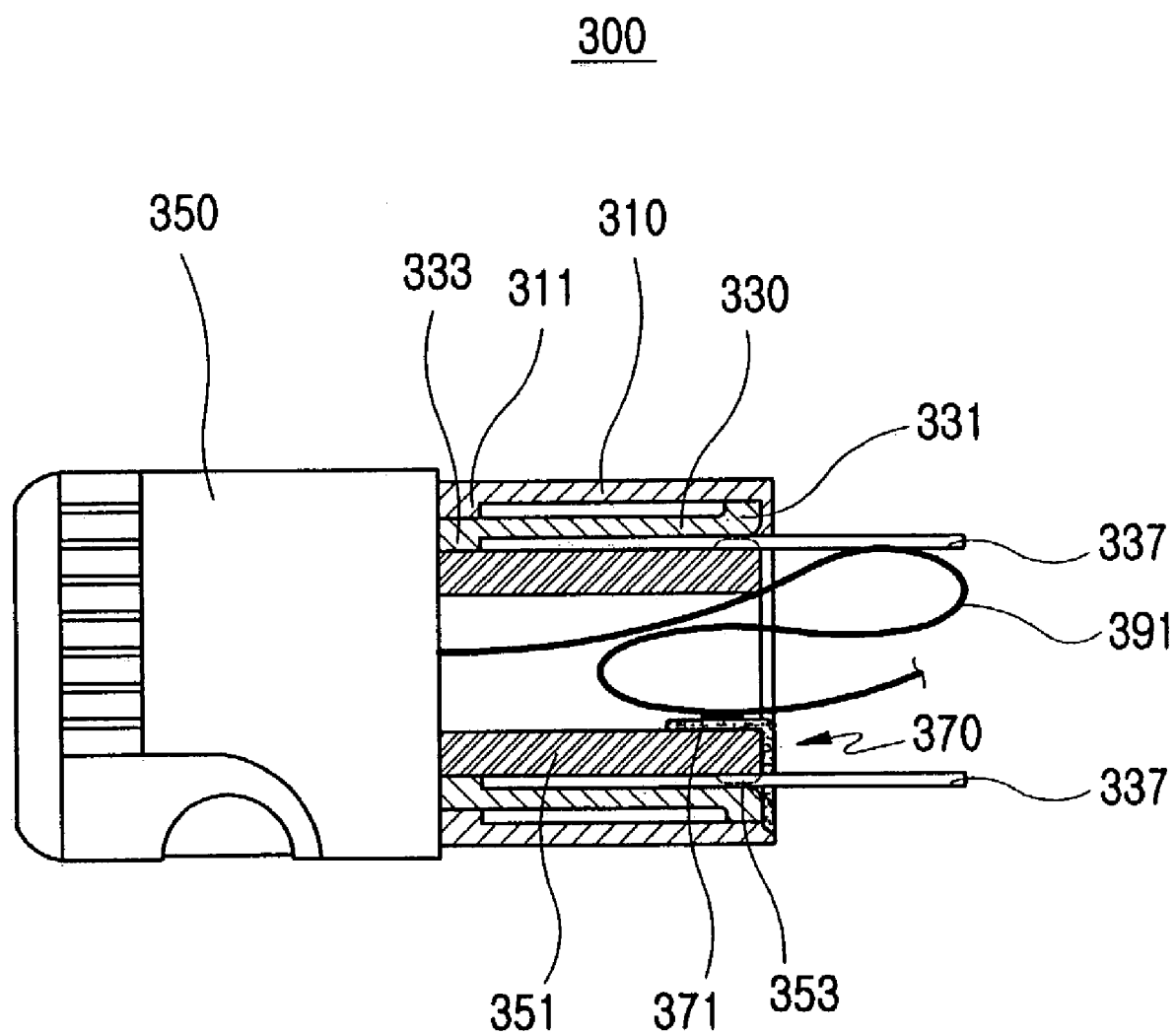
FIG. 5 is a partial cross-sectional view of the camera lens assembly of FIG. 4.

FIG. 4 is an assembled perspective view of the camera lens assembly 300 of FIG. 2. In FIG. 4, the guide shaft 351 of the lens housing 350 and the second guide housing 330 are fully drawn into the first guide housing 310. FIG. 5 is a partial cross-sectional view of the camera lens assembly 300 of FIG. 4. As shown in FIGS. 4 and 5, when the guide shaft 351 of the lens housing 350 and the second guide housing 330 are fully drawn into the first guide housing 310, each of one ends of the guide shaft 351 and the second guide housing 330 contacts the holding plate 370 connected to the end of the first guide housing 310. In this case, each of the other ends of the guide shaft 351 and the second guide housing 330 contacts the lens housing 350.

Also, the flexible printed circuit 391 is fixed to the holder 371 of the holding plate 370 at a designated position. When the guide shaft 351 and the second guide housing 330 are fully drawn into the first guide housing 310, the holder 371 is inserted into the guide shaft 351. Therefore, the flexible printed circuit 391 is bent, and a part of the flexible printed circuit 391 is again accommodated within the guide shaft 351. A non-accommodated part of the flexible printed circuit 391 within the guide shaft 351 is bent within the protectors 337 extending from the second guide housing 330, thereby being protected from the outside.

The printed circuit protector 337 is extended to the outside through the opening 373 or the through hole 375 of the holding plate 370. Therefore, when the second guide housing 330 is rotated within the first guide housing 310, the holding plate 370 is simultaneously rotated.

Figure 6:
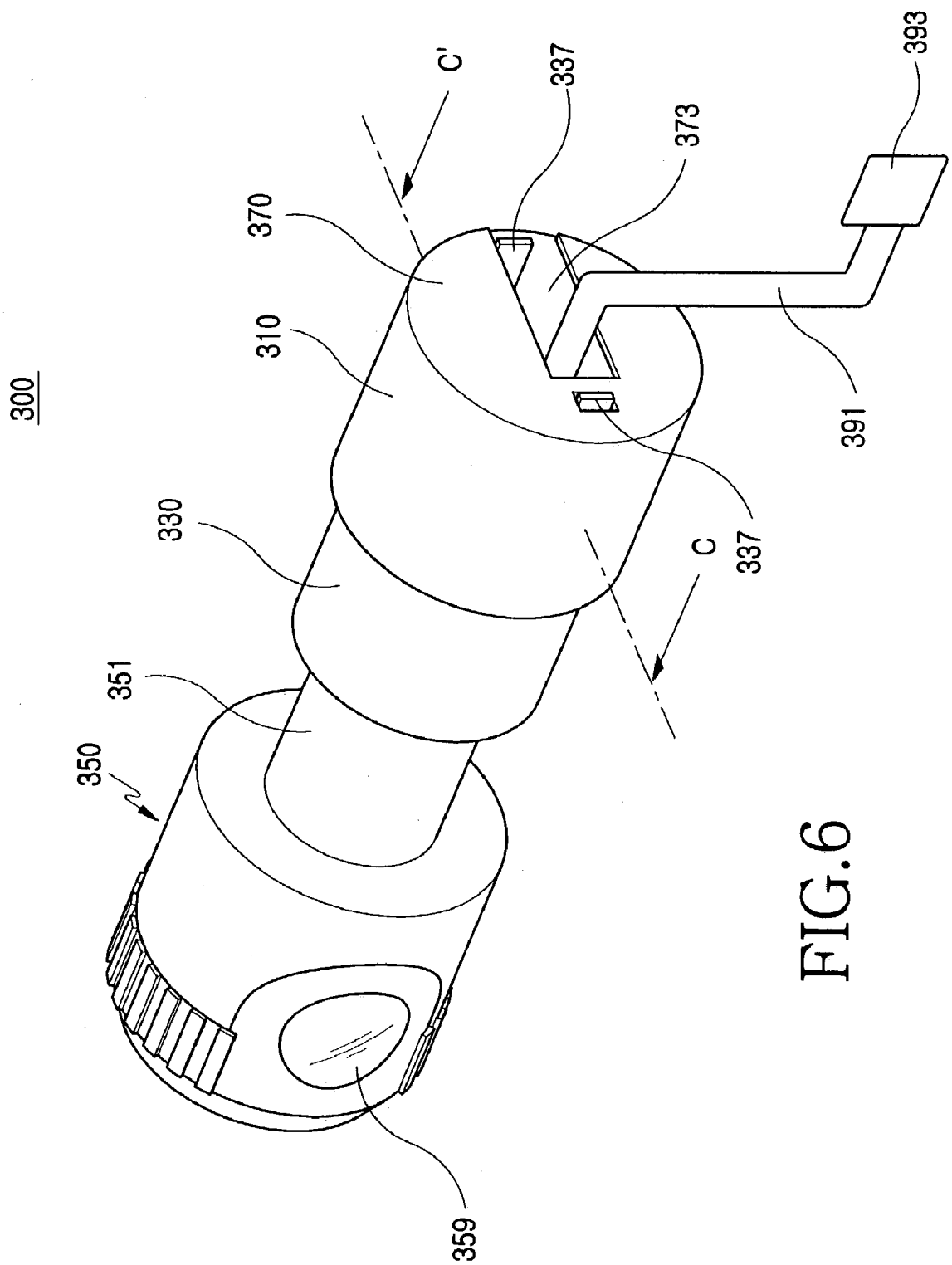
FIG. 6 is a perspective view of the camera lens assembly of FIG. 2 provided with a drawn-out lens housing.
Figure 7:
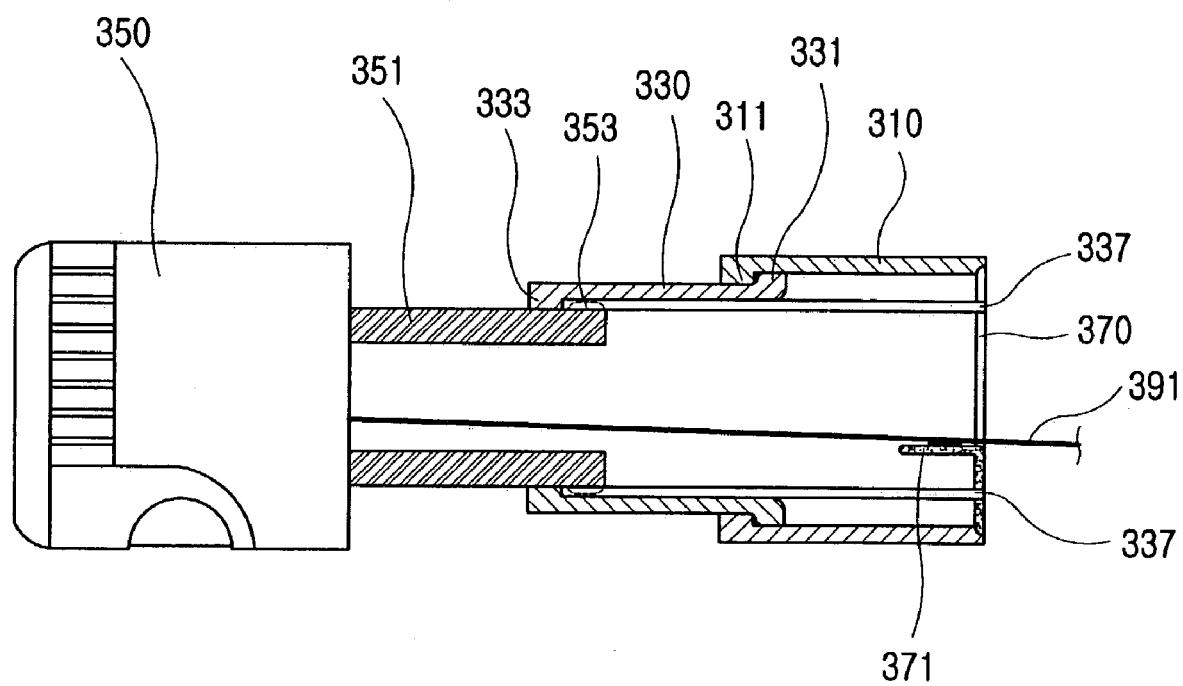
FIG. 7 is a partial cross-sectional view of the camera lens assembly of FIG. 6.

FIG. 6 is a perspective view of the camera lens assembly 300 of FIG. 2 provided with the lens housing 350 in a fully drawn-out state, and FIG. 7 is a partial cross-sectional view of the camera lens assembly 300 of FIG. 6. As shown in FIGS. 6 and 7, when the lens housing 350 is fully drawn out, the second guide housing 330 is fully drawn out. When the lens housing 350 is fully drawn out, each of the first to fourth stoppers 311, 331, 333, and 353 is engaged with the corresponding one of the first to fourth stoppers 311, 331, 333, and 353. That is, the first stopper 311 of the first guide housing 310 is engaged with the second stopper 331 of the second guide housing 330, and the third stopper 333 of the second guide housing 330 is engaged with the fourth stopper 353 of the guide shaft 351. Therefore, the drawing-out distances of the first and second guide housings 310 and 330, and the drawing-out distance of the lens housing 350, are limited by the first to fourth stoppers 311, 331, 333, and 353.

When the lens housing 350 is fully drawn out, the flexible printed circuit 391 between the lens housing 350 and the holder 371 is spread in a straight line. In order to protect the flexible printed circuit 391 from an impact applied thereto when the lens housing 350 is fully drawn out, the flexible printed circuit 391 between the lens housing 350 and the holder 371 has a designated amount of spare length.

With reference to FIG. 2, when the lens housing 350 is drawn out, the lens housing 350 is protruded from one side of the main body 201 of the terminal 200. Since the second guide housing 330 is rotatable, the lens housing 350 is rotated simultaneously with the rotation of the second guide housing 330, thereby photographing a subject at various angles without being limited by the main body 201 or the folder 202 of the terminal 200. As discussed above, the camera lens assembly is drawn into and out from the main body of the portable wireless terminal using two guide housings and the guide shaft extended from the lens housing. However, in consideration the drawing-out distance of the lens housing, a connection position of the camera lens assembly to the main body, a structural stability of the camera lens assembly connected to the main body, and so on, the camera lens assembly drawn into and out from the main body of the portable wireless terminal may comprise one guide housing or plural guide housings, such as an amount more than three.

As apparent from the above description, the embodiments of the present invention provide a camera lens housing of a portable wireless terminal, which can be drawn into and out from one side of the main body of the terminal, to thus not limit the range of its photographing angle by the main body or the folder of the terminal. Further, the camera lens assembly according to the embodiments of the present invention described above is drawn out from the main body of the portable wireless terminal, and its orientation is easily adjusted, allowing for convenient manipulation by a user.

Although several embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A camera lens assembly of a portable wireless terminal, comprising:
   a first guide housing having a cylindrical shape with both ends opened and having a designated length;
   a second guide housing having a cylindrical shape with both ends opened, and being rotatable within the first guide housing and inserted into the first guide housing so as to be drawn into and out from tile first guide housing in a longitudinal direction and a pair of printed circuit protectors extending from the second guide housing; and
   a lens housing, adapted to accommodate a camera lens, and including a guide shaft extended from its one end in a longitudinal direction so as to be drawn into and out from the second guide housing in a longitudinal direction, and a flexible printed circuit extending from the guide shaft and between the printed circuit protectors.

2. The camera lens assembly of a portable wireless terminal as set forth in claim 1, further comprising:
   a holding plate being connected to one end of the first guide housing and including a holder extending into the first guide housing,
   such that the flexible printed circuit is fixed to the holder at a designated position.

3. The camera lens assembly of a portable wireless terminal as set forth in claim 2, wherein when the second guide housing is fully drawn into the first guide housing and simultaneously the guide shaft of the lens housing is fully drawn into the second guide housing, the flexible printed circuit is bent at least one time between the end of the guide shaft and the holder, and when the second guide housing is fully drawn out from the first guide housing and simultaneously the guide shaft of the lens housing is fully drawn out from the second guide housing, the flexible printed circuit is spread between the end of the guide shaft and the holder.

4. The camera lens assembly of a portable wireless terminal as set forth in claim 3, wherein the printed circuit protectors extend from one end of the second housing in a longitudinal direction, such that when the second guide housing is fully drawn into the first guide housing and simultaneously the guide shaft of the lens housing is fully drawn into the second guide housing, the holding plate contacts the end of the guide shaft so that the holder is inserted into the guide shaft, and the bent flexible printed circuit is disposed between the inside of the guide shaft and the protectors.

5. The camera lens assembly of a portable wireless terminal as set forth in claim 1, further comprising:

a first stopper protruding from an inner circumference of one end of the first guide housing in a circumferential direction; and a second stopper protruding from an outer circumference of one end of the second guide housing in a circumferential direction so as to correspond to the first stopper, to limit a drawing-out distance of the second guide housing from the first guide housing.

6. The camera lens assembly of a portable wireless terminal as set forth in claim 1, further comprising:

a third stopper protruding from an inner circumference of the other end of the second guide housing in a circumferential direction; and a fourth stopper protruding from an outer circumference of one end of the guide shaft in a circumferential direction so as to correspond to the third stopper, to limit a drawing-out distance of the lens housing from the second guide housing.

7. A camera lens assembly of a portable wireless terminal, comprising:

a first guide housing having a cylindrical shape with a predetermined length and open ends;

a second guide housing having a cylindrical shape with open ends and being rotatable and axially coupled within the first guide housing, a lens housing, adapted to accommodate a camera lens, and including a guide shaft extending axially therefrom and being axially movable and rotatably fixed within the second guide housing, a stopper protruding from an outer circumference of one end of the guide shaft in a circumferential direction;

a sliding recess formed on a designated position of the stopper; and a sliding guide protruding an inner circumference of the second guide housing in a longitudinal direction so as to correspond to the sliding recess, such that the lens housing performs a rectilinear motion in the longitudinal direction of the second guide housing and simultaneously the second housing is rotated within the first guide housing by the rotation of the lens housing.

8. A portable wireless terminal, comprising:
a main body;
a folder hinged to the main body so as to be opened from and closed into the main body; and a camera lens assembly rotatably connected to a hinge axis of the folder, such that the camera lens assembly is formed as a body tube so as to be drawn into and out from the main body in the direction of the hinge axis, wherein the camera lens assembly includes:

a first guide housing having a cylindrical shape with both ends opened, and having a designated length;

a second guide housing having a cylindrical shaped with both ends opened, and being rotatable within the first guide housing and simultaneously inserted into the first guide housing so as to be drawn into and out from the first guide housing in a longitudinal direction; and a lens housing, adapted to accommodate a camera lens, including a guide shaft extending from its one end in a longitudinal direction so as to be drawn into and out from the second guide housing in a longitudinal direction.

9. The portable wireless terminal as set forth in claim 8, wherein side hinge arms are respectively installed on both sides of an upper end of the main body, and the first guide housing is fixed into the side hinge arms.

10. The portable wireless terminal as set forth in claim 8, further comprising:

a flexible printed circuit protruding from the camera lens via the guide shalt in a longitudinal direction; and a holding plate being connected to one end of the first guide housing and including a holder extended into the first guide housing, such that the flexible printed circuit is fixed to the holder at a designated position.

11. The portable wireless terminal as set forth in claim 10, wherein a portion forming an opening with a designated width extends from the outer circumference of the holding plate in a diametric direction, the holder extends from the internal end of the opening, and the flexible printed circuit protrudes to the outside via the opening.

12. The portable wireless terminal as set forth in claim 10, wherein when the second guide housing is fully drawn into the first guide housing and simultaneously the guide shaft of the lens housing is filly drawn into the second guide housing, the flexible printed circuit is bent at least one time between the end of the guide shaft and the holder, and when the second guide housing is fully drawn out from the first guide housing and simultaneously the guide shaft of the lens housing is fully drawn out from the second guide housing, the flexible printed circuit is spread between the end of the guide shaft and the holder.

13. The portable wireless terminal as set forth in claim 12, further comprising a pair of printed circuit protectors extending from one end of the second housing in a longitudinal direction, wherein when the second guide housing is fully drawn into the first guide housing and simultaneously the guide shaft of the lens housing is fully drawn into the second guide housing, the holding plate contacts the end of the guide shaft so that the holder is inserted into the guide shaft, and the bent flexible printed circuit is disposed between the inside of the guide shaft and the protectors.

14. The portable wireless terminal as set forth in claim 13, wherein a through hole is formed through the holding plate at its designated position, and one of the printed circuit protectors passes through the through hole.

15. The portable wireless terminal as set forth in claim 8, further comprising:
- a stopper rib protruding from an outer circumference of one end of the guide shaft in a circumferential direction;
- a sliding recess formed on a designated position of the stopper rib; and
- a sliding guide protruding from an inner circumference of the second guide housing so as to correspond to the sliding recess, such that the lens housing performs a rectilinear motion in the longitudinal direction of the second guide housing and simultaneously the second housing is rotated within the first guide housing by the rotation of the lens housing.

16. A portable wireless terminal comprising:
a main body,
a folder hinged to the main body to be movable between an open and closed position with respect to the main body,
a camera lens assembly having a first guide housing and a lens housing for accommodating a camera lens and being movable in an axial direction with respect to the first guide housing between a retracted position and an extended position,
a holding plate coupled to one end of the first guide housing and having an opening therein and a holder extending from an inner edge of the opening in a direction toward the lens housing, and
a flexible printed circuit coupled to the camera lens assembly and fixed to the holder of the holding plate and extending through the opening.

17. The portable wireless terminal of claim 16, wherein the holder extends into the lens housing when in the retracted position.

18. The portable wireless terminal of claim 17, wherein the camera lens assembly comprises a second guide housing coupled to the first guide housing and being slidable in an axial direction with respect to the first guide housing.

19. The portable wireless terminal of claim 18, wherein the lens housing is slidably coupled and rotatably fixed to the second guide housing.

20. The portable wireless terminal of claim 19, wherein the second guide housing includes a pair of printed circuit protectors extending toward the first guide housing and extend through the first guide housing in the refracted position with respect to the first guide housing, and where the printed circuit projects from the first guide housing with the printed circuit positioned between the circuit protectors.

21. The portable wireless terminal of claim 20, wherein the circuit protectors extend through an opening in the holding plate so that the second guide housing is rotatably fixed with respect to the holding plate and the first guide housing.

* * * * *